United States Patent [19]
Harris

[11] 3,775,820
[45] Dec. 4, 1973

[54] COMPACTING ROLL STRUCTURE AND METHOD

[75] Inventor: Leroy S. Harris, Rolling Meadows, Ill.

[73] Assignee: K-G Industries, Inc., Rosemont, Ill.

[22] Filed: July 5, 1972

[21] Appl. No.: 269,049

[52] U.S. Cl. .................. 29/118, 29/123, 29/129.5
[51] Int. Cl. .................................................. B60b 7/00
[58] Field of Search ................ 29/123, 124, 125, 29/129.5, 110, 118, 119, 148.4 D; 425/194, 195

[56] References Cited
UNITED STATES PATENTS

| | | | |
|---|---|---|---|
| 912,255 | 2/1909 | Nash | 29/124 |
| 2,835,518 | 5/1958 | Naab | 29/148.4 D X |
| 2,958,903 | 11/1960 | Decker | 425/195 |
| 3,077,634 | 2/1963 | Komarek et al. | 29/123 X |
| 3,231,205 | 1/1966 | Spangler | 29/123 X |

FOREIGN PATENTS OR APPLICATIONS

| | | | |
|---|---|---|---|
| 567,069 | 1/1945 | Great Britain | 29/124 |

Primary Examiner—Alfred R. Guest
Attorney—McDougall, Hersh & Scott

[57] ABSTRACT

A material compacting apparatus and method wherein a roll tire is located on a supporting shaft section. The roll tire is preferably heated to a temperature in excess of the shaft temperature whereby the tire can be more readily located in position relative to the shaft section. A key structure is employed for securing the tire against movement relative to the shaft section. The key structure comprises a base which is attached to the shaft section and an extension adapted to be received within a recess defined in a side edge of the roll tire. A retaining plate serves to adjustably hold wedges which are adapted to be inserted between the sidewall of a key extension and an inner wall of a recess. A plurality of key structures are preferably employed and the retaining plate serves to secure the assembly of keys and wedges after the wedges are tightly fit relative to the key extension.

23 Claims, 21 Drawing Figures

COMPACTING ROLL STRUCTURE AND METHOD

This invention relates to a method and apparatus for providing improved roll structures. The invention will be particularly described with reference to compacting equipment employing a roll tire associated with a supporting shaft; however, it will be apparent that the concepts of the invention are applicable to a variety of roll constructions. As an example of the utility of the invention, the compacting roll can be utilized in briquetting operations and similar operations where high stresses and otherwise severe operating conditions are encountered. Alternatively, the invention has application with respect to roll structures formed from materials having good compressive strength but poor tensile strength whereby even low tensile forces can damage a roll.

Due to the stresses encountered and temperature conditions of material compacting operations, the production of suitable compacting rolls has always created problems. Such rolls, for example when made from hardenable cast materials, are subject to cracking. If a degree of ductility is provided, the roll material is often too soft to withstand long periods of use. This, of course, requires relatively frequent replacement of high cost rolls.

In order to overcome certain difficulties encountered in the production of material compacting rolls, attempts have been made to produce rolls whereby the compacting surfaces could be more easily replaced. Removable briquetting roll inserts have been suggested, for example as described in Komarek, et al. U.S. Pat. No. 3,077,634. Although structures of this type permit replacement of worn roll parts, the multiplicity of operations involved tends to be inefficient. In addition, the production of a large number of separate roll parts, each of which must be accurately dimensioned, results in a relatively expensive construction.

Attempts have also been made to provide roll tires which comprise integral cylindrical members which can be located on a roll shaft. Such members have roll pockets defined on their outer surfaces and means are provided for securing the tires on the roll shaft. The latter may be accomplished by shrink fitting the roll tire on the shaft or through the use of key structures which comprise axial keys adapted to be received by key slots formed in the hardened steel tires.

In a briquetting operation, roll tires and the attaching means therefor are subjected to very high cyclic compressive forces in addition to driving torque forces. In the case of shrink-fit tires, the hich cyclic stresses lead to the development of cracks which make this arrangement impractical in high force applications or with roll materials of low strength. In the case of available key designs, the provision of slots or other arrangements for securing keys to the roll tire results in stress concentrations. Accordingly, cracks are also prevalent in applications of this type.

It is a general object of this invention to provide a roll tire construction which can be efficiently secured to a supporting roll shaft and effectively maintained in position on the shaft.

It is a further object of this invention to provide a roll tire construction in association with a novel key arrangement whereby the roll tire can be maintained on the shaft until replacement is required due to wear experienced by the roll tire.

These and other objects of this invention will appear hereinafter and for purposes of illustration, but not of limitation, reference is made to the accompanying drawings in which.

This invention is generally directed to a material compacting apparatus and method wherein a roll tire is located on a supporting shaft. The tire is secured to the shaft by means of at least one key which defines a base and an extension from the base. The base is secured to the supporting shaft while the extension fits within a recess defined by a roll tire.

At least one wedge is located in the recess along with the extension. A retaining plate is associated with the described combination for adjustably holding the wedge within the recess. The combination is designed so that the wedge can be fitted into place to tightly secure the roll tire from rotation relative to the supporting shaft. Once the adjustment of the wedge is completed, securing means associated with the retaining plate serve to lock the wedges in position whereby a fixed relationship between the roll tire and supporting shaft can be maintained.

In the assembly of a roll tire and supporting shaft, the roll tire is preferably heated to a temperature in excess of the shaft temperature. The inner dimension of the roll tire is only slightly greater or slightly less than the outer dimension of the shaft, and the heating serves to expand the roll tire to simplify positioning of the tire on the shaft.

At least one key structure of the type described is located in place whereby the roll tire can be locked in position prior to cooling down to the temperature of the shaft. Additional key elements are preferably located around both sides of the roll tire.

Figure 1:
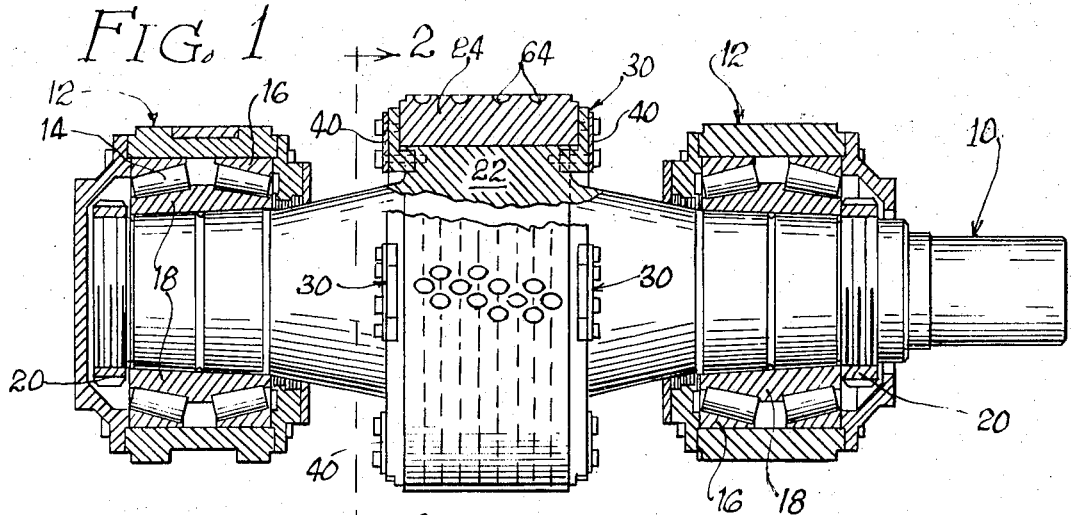
FIG. 1 is a plan view of a roll shaft and roll tire construction characterized by the features of this invention.
Figure 2:
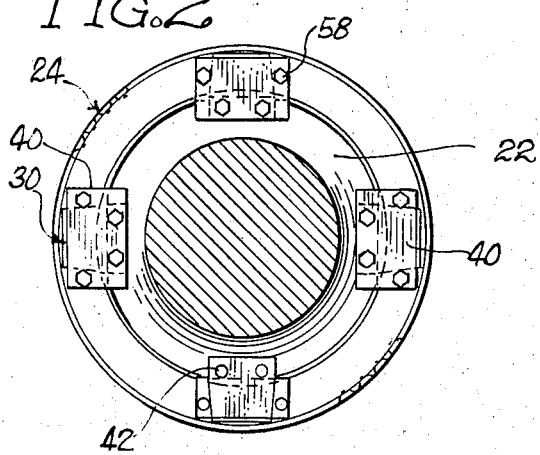
FIG. 2 is a cross-sectional view taken about the line 2—2 of FIG. 1.
Figure 3:
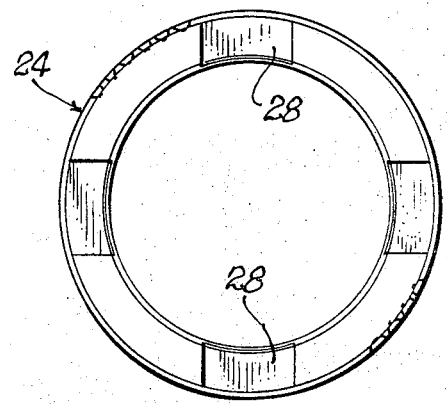
FIG. 3 is an end elevation of a roll tire characterized by the features of this invention.
Figure 4:
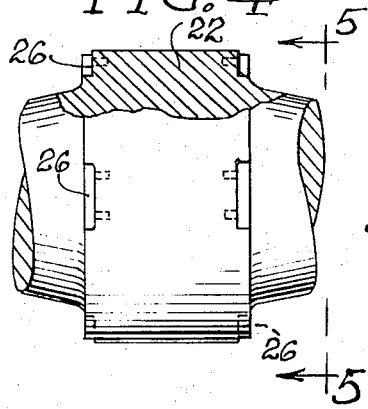
FIG. 4 is a fragmentary plan view illustrating a roll shaft designed for use in conjunction with the roll tire of FIG. 3.
Figure 5:
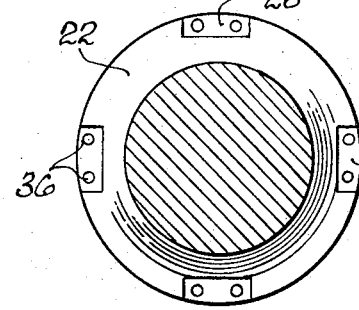
FIG. 5 is an end elevation of the roll shaft taken about the line 5—5 of FIG. 4.
Figure 6:
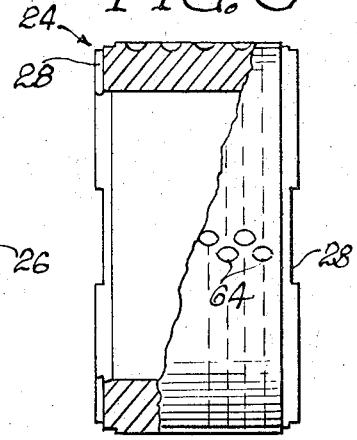
FIG. 6 is a plan view of the roll tire shown partly cut away.
Figure 7:
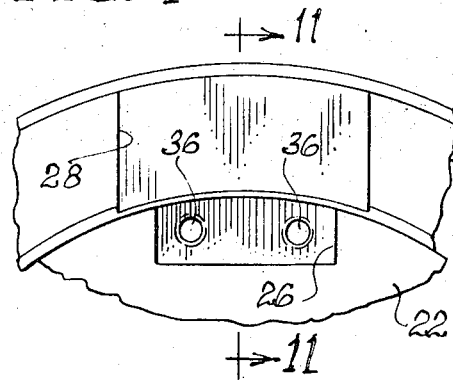
FIG. 7 is an enlarged fragmentary view illustrating the alignment of roll tire and roll shaft recessed areas.

FIG. 1 of the accompanying drawings illustrates a roll shaft 10 adapted to rotate within bearing boxes 12. These boxes include roller bearings 14 positioned between stationary races 16 and movable races 18 which are positioned on the shaft by means of locknuts 20. A drive gear (not shown) is provided for imparting rotation to the shaft.

A centrally located shaft section 22 is provided for supporting a roll tire 24. This shaft section comprises a larger diameter section with the dimensions thereof being close to the inner diameter of the roll tire. Accordingly, the roll tire is adapted to be removably received on the shaft section; however, a very close fit will be achieved.

The shaft section 22 defines a plurality of recessed portions 26. These recessed portions are located at 90° intervals on both sides of the shaft. A plurality of recessed portions 28 are located in corresponding positions on the roll tire 24. Accordingly, when a roll tire is placed on a shaft 10, each recessed area 28 can be lined up with a recessed area 26.

Figure 8:
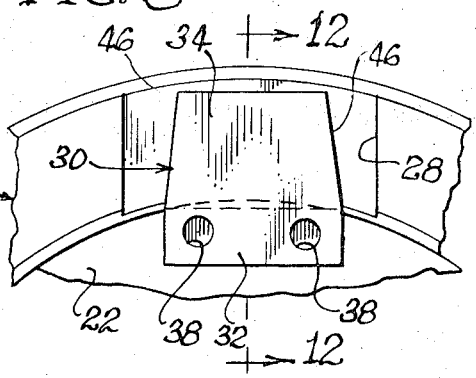
FIG. 8 is an enlarged fragmentary view illustrating the roll tire and shaft areas with a key member in place.
Figure 11:
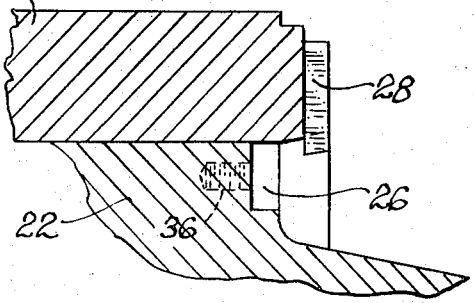
FIG. 11 is a sectional view taken about the line 111—11 of FIG. 7.
Figure 12:
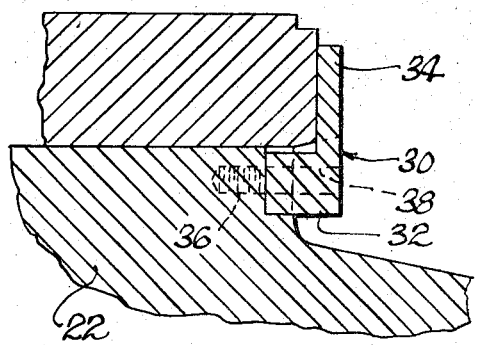
FIG. 12 is a sectional view taken about the line 12—12 of FIG. 8.

A key structure 30, best illustrated in FIGS. 8 and 12, is adapted to be associated with the recessed areas of the roll tire and shaft. This key structure comprises a base 32 and an outward extension 34. As best shown in FIG. 11, the recessed areas 26 are positioned inwardly relative to the recessed areas 28, and the L-shaped design of the key structure therefore permits association of the structure with both recessed areas.

The shaft section 22 defines a pair of threaded openings 36 at the bottom of each recessed area 26. The key structure defines a pair of openings 38 which are adapted to be aligned with the openings 36 when the key base is positioned in the recessed area 26.

Figure 10:
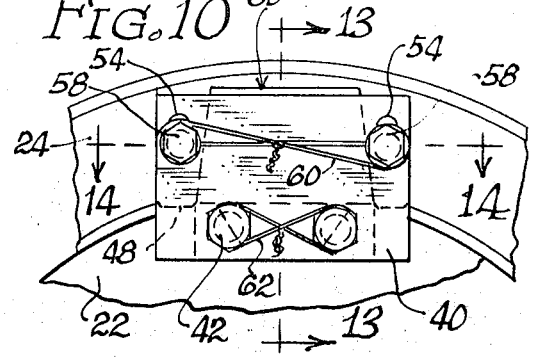
FIG. 10 is an enlarged fragmentary view illustrating the roll tire and shaft areas with a retaining plate in position.
Figure 13:
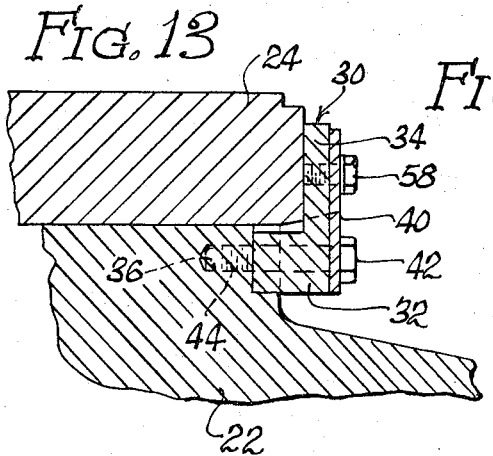
FIG. 13 is a sectional view taken about the line 13—13 of FIG. 10.
Figure 14:
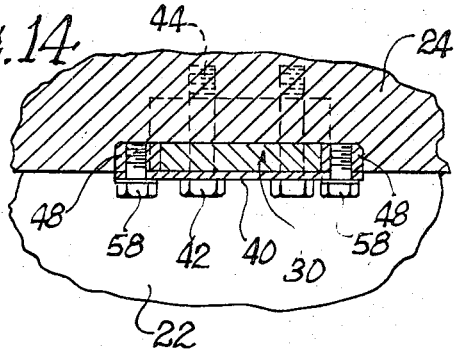
FIG. 14 is a sectional view taken about the line 14—14 of FIG. 10.

A retaining plate 40 best illustrated in FIGS. 10, 13 and 14 defines additional openings for alignment with the openings 36 and 38. A pair of bolts 42 are employed for securing the key structure and retaining plate to the shaft section. These bolts define threaded ends 44 which accomplishes this purpose.

Figure 9:
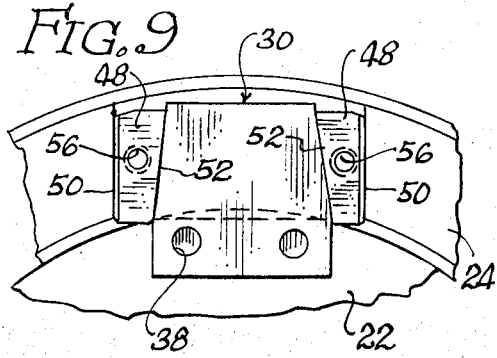
FIG. 9 is an enlarged fragmentary view illustrating the roll tire and shaft areas with wedge members in place.

As illustrated, the recesses 28 are wider than the recesses 26. In addition, the sides 46 of the extension 34 taper inwardly whereby the outer extremity of the extension is narrower than the poriton adjacent the base. This combination results in a pair of openings on opposite sides of the extension 34 adapted to receive wedges 48 as best illustrated in FIG. 9.

The wedges 48 each define a straight edge 50 and a tapered edge 52 adapted to mate with the tapered sides 46 of the extension 34. With the plate 40 in place, pockets are defined on opposite sides of the extension 34 for receiving the wedges 48. Accordingly, the wedges 48 can be adjusted within these pockets while being retained therein by means of the plate 40.

A pair of slots 54 are defined by the plate 40, and these slots are adapted to be lined up with openings 56 defined by the wedges 48. The openings 56 are threaded openings, and bolts 58 are provided for securing the plate and wedges together. The bolts 58 need not be tightened until the wedges 48 are in proper position after which the bolts serve to secure the wedges in position.

The heads of the bolts 42 and 58 define openings for receiving wires 60 and 62. Once these wires are tightened, rotation of the bolts, for example rotation which could result from machine vibration, can be prevented.

In the use of a construction of the type described, a roll tire 24 can be located on a shaft section 22 before the shaft is mounted in both bearing blocks. In order to facilitate mounting of the roll tire, it is preferable to heat the tire to a temperature at least 100° F. greater than the temperature of the roll shaft section. The slight expansion of the roll tire inner diameter will permit location of the roll tire in place without great difficulty, and a snug fit will then be achieved when the roll tire cools to the temperature of the shaft section. It will be appreciated, however, that this technique is not intended as a shrink-fit of the roll tire relative to the shaft section.

The key structures on one side of the roll tire may be located in place prior to or subsequent to positioning of the roll tire on the shaft. In a preferred method for assembly, two of the radial keys are bolted in place by means of plates 40 at diametrically opposite positions. The heated roll tire is then placed on the shaft and aligned with the keys. The remaining keys are then located in place on both sides of the roll tire. The wedges 48 which are preferably positioned after the retaining plates are in place are forced into tight fitting engagement all around both sides of the roll tire. Finally, the bolts 54 are tightened and the safety wires added.

The key arrangement for securing roll tires in accordance with the features of this invention eliminates problems which characterize prior art arrangements. Since the tire is attached to the shaft without the use of a high shrink-fit, severe forces which could lead to cracks are not developed. In addition, the location of the key recesses 28 in the roll tire is selected so that regions of high stress will not be developed.

The wedges are designed so that the wedge angle is such that the coefficient of friction will be sufficient to normally retain the wedges in position. Thus, a small angle of about 7° is preferred to eliminate any great tendency for the wedges to back out of the pockets receiving the wedges. By employing an arrangement of this nature, the need for accurate precision machining operations is eliminated. Thus, the roll tire position relative to the shaft can be controlled by means of the wedges even if some of the parts or recesses vary in dimensions. With this arrangement, the pockets 64 defined by roll tire can be accurately lined up with the corresponding pockets on an adjacent roll tire in the compacting apparatus. Thus, the formation of briquet compacting rolls with complimentary pockets is often required, and it is necessary to maintain the pockets of the respective rolls in alignment with each other. The roll structure described herein facilitates this end.

Figure 15:
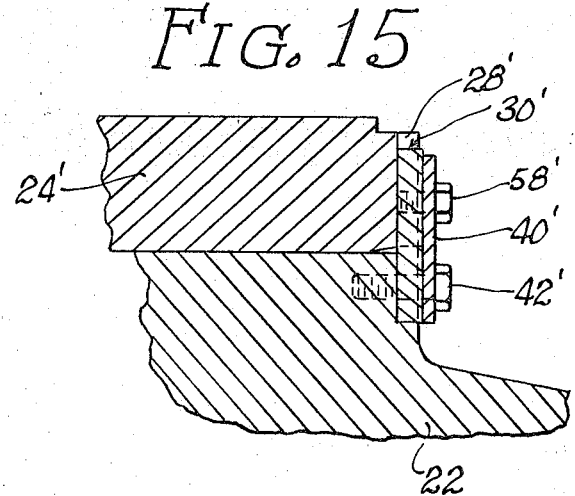
FIG. 15 is a fragmentary view illustrating an alternative arrangement for securing a roll tire to a shaft.
Figure 16:
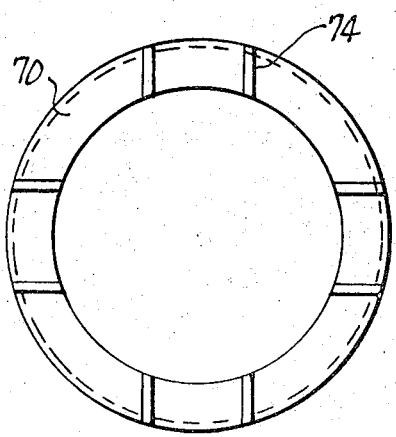
FIG. 16 is a side elevation of a roll tire structure adapted for use in an alternative form of the invention.
Figure 17:
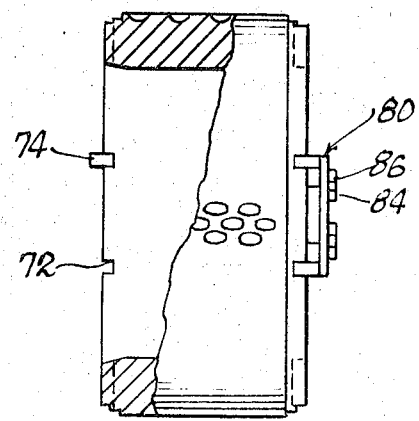
FIG. 17 is an elevational view, partly cut away, of the roll tire construction shown in FIG. 16 and illustrating the retaining mechanism utilized therewith.
Figure 18:
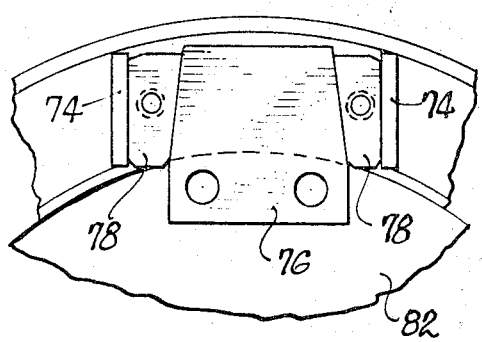
FIG. 18 is an enlarged fragmentary view illustrating the retaining key and wedge assembly employed with the structure of FIGS. 16 and 17.
Figure 19:
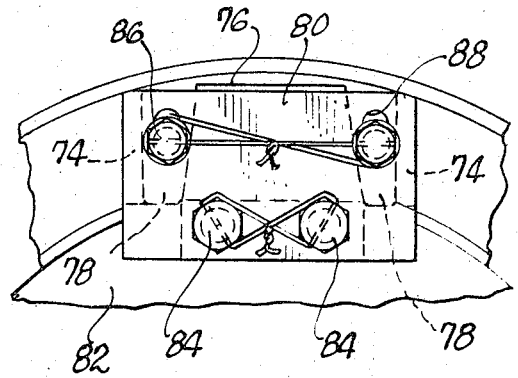
FIG. 19 is an enlarged fragmentary view illustrating the retaining arrangement of FIG. 18 with the retaining plate secured in place.

FIG. 15 illustrates one alternative form of the invention. In this construction, the key 30' is secured directly to the shaft 22' by means of a bolt 42'. The shaft portion which supports the roll tire 24' is, in this instance, the same length as the roll tire whereby the recesses in the shaft and roll tire which receive the key 30' are in direct alignment. With this arrangement, an inwardly extending base need not be provided for the key. The retaining plate 40' is secured by means of bolts 58', and wedges (not shown) are utilized to fill the recess 28' in the manner described with reference to FIGS. 1–14.

FIGS. 16–19 illustrate a still further alternative form of the invention. In this instance, the roll tire 70 is provided with a plurality of keyways 72 which receive keys 74. The keys are spaced apart to define areas which provide recesses for receipt of keys 76 and wedges 78. A retaining plate 80 is provided for maintaining the assembly in position relative to shaft 82 by means of bolts 20 and 84. Additional bolts 86 extend through slots 88, and serve to secure the wedges in place in the manner previously described.

Figure 20:
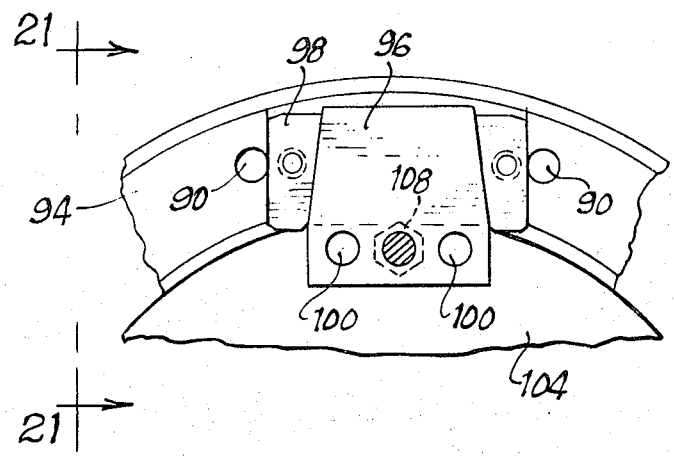
FIG. 20 is an enlarged fragmentary view illustrating a further alternative arrangement for a retaining mechanism; and, FIG. 21 is a fragmentary view taken about the line 21—21 of FIG. 20 and illustrating the mechanism with the retaining plate in position.
Figure 21:
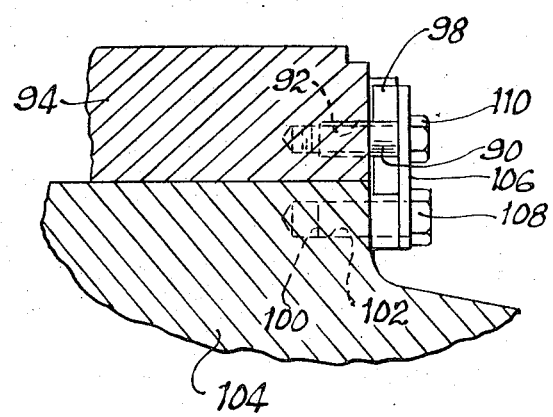

In the arrangement illustrated in FIGS. 20 and 21, pairs of dowels 90 are secured and press-fit into bores 92 defined by the roll tire 94. The area defined between the dowels provides a recess for receiving the key 96 and wedges 98. An additional pair of dowels 100 may be press-fit into bores 102 defined by the shaft 104. These dowels serve to align the key 96 during assembly. Te retaining plate 106 can then be secured in position by means of bolt 108. Bolts 110 are then utilized for securing the wedges in position in the manner already described.

It will be understood that various changes and modifications may be made in the above described construction which provide the characteristics of this invention without departing from the spirit thereof, particularly as defined in the following claims.

That which is claimed is:

1. In an apparatus wherein a roll tire is located on a supporting shaft section, the improvement comprising means for securing the tire to the shaft, said securing means including at least one key defining a base, means attaching said base to said shaft, a key extension formed on said base and extending outwardly therefrom, an area along the side edge of said roll tire receiving said extension, at least one wedge received within said area along with said extension, and means for adjustably attaching said wedge within said area whereby fitting of said wedge within said area operates to secure said tire against movement relative to said shaft.

2. An apparatus in accordance with claim 1 wherein the base of said key is bolted to said shaft.

3. An apparatus in accordance with claim 1 wherein said area comprises a recess defined by said side edge, and including a pair of wedges positioned within said recess on either side of said extension.

4. A construction in accordance with claim 3 wherein the means for adjustably attaching said wedges comprises a plate positioned over said extension and said wedges, slots defined by said plate, and bolts extending through said slots and connected to said wedges.

5. A construction in accordance with claim 4 wherein said plate extends over the base of said key, and including first openings defined by said plate, second openings defined by said base aligned with said first openings, and third openings in said shaft, said third openings being aligned with said first and second openings, and bolt means received in said aligned openings for securing said plate and key to said shaft.

6. An apparatus in accordance with claim 1 wherein a plurality of said keys are located at circumferentially spaced positions around said tire.

7. An apparatus in accordance with claim 6 wherein said keys are positioned on both sides of the tire.

8. An apparatus in accordance with claim 1 wherein said key comprises an L-shaped member with said base extending axially inwardly relative to said shaft section, and wherein said extension comprises a leg directed radially outwardly relative to said shaft section for engagement with the sides of said tire, at least one side of said tire extending beyond said shaft section for engagement with said leg.

9. A construction in accordance with claim 1 wherein said roll tire is located on a supporting shaft section having a length approximately equal to the roll tire, and including aligned recesses defined by said roll tire and shaft section, said key comprising a first plate having a base portion fit within a recess defined by said shaft section, and an extending portion positioned within a recess defined by said roll tire, said last mentioned recesses being sufficiently larger than said extending portion of said key to permit inclusion of said wedge.

10. A construction in accordance with claim 1 wherein said roll tire defines at least one pair of keyways, keys secured within said keyways and extending outwardly from the side of said roll tire, said area being defined between said keys.

11. A construction in accordance with claim 1 including at least one pair of dowels secured on the side of said roll tire, said area being defined between said dowels.

12. In a method for securing a roll tire to a supporting shaft section, said method comprising the steps of providing at least one key, said key including a base and an outward extension thereof, securing said base to said shaft, sliding said roll tire onto said shaft, said roll tire defining an area in at least one side for receiving said extension, inserting at least one wedge in said area along with said extension and tightly fitting said wedge and extension in said area to secure said tire against movement relative to said shaft, and applying at least one key and wedge combination on the other side of said roll tire.

13. A method in accordance with claim 12 including the steps of locating a plate in overlapping relationship with each wedge and extension, and fastening said plate to said shaft.

14. A method in accordance with claim 13 wherein said area comprises a recess defined by said roll tire, and wherein said plate is secured to said shaft prior to locating a wedge in said recess, and separately securing said wedge relative to said plate after tight fitting of said wedge in said recess.

15. A method in accordance with claim 14 wherein two wedges located on opposite sides of said extension are located in each roll tire recess.

16. A method in accordance with claim 15 including the step of locating a plurality of said keys in a plurality of recesses positioned in circumferentially spaced relationship around said roll tire.

17. A method in accordance with claim 16 wherein said keys and recesses are positioned on both sides of said roll tire.

18. A method in accordance with claim 17 wherein said recesses are formed in the side edges of said roll tire, said plates combining with said recesses to form pockets receiving said extensions with openings in said pockets on either side of said extensions for receiving said wedges, said wedges being driven radially inwardly during fitting of the wedges within said pocket openings.

19. A method in accordance with claim 13 wherein said area comprises a recess defined between a pair of members extending outwardly from a side edge of said roll tire, and wherein said plate is secured to said shaft prior to locating a wedge in said recess, and separately securing said wedge relative to said plate after tight fitting of said wedge in said recess.

20. In a material compacting apparatus wherein a roll tire is located on a supporting shaft section, the improvement comprising means for securing the tire to the shaft, said securing means including at least one key defining a base, means attaching said base to said shaft, a key extension formed on said base and extending outwardly relative to the axis of said shaft, at least one side of said tire defining a key receiving area, said extension being received in said area thereby restricting movement of said tire relative to said shaft.

21. An apparatus in accordance with claim 20 wherein the base of said key is bolted to said shaft.

22. An apparatus in accordance with claim 20 wherein a pair of wedges are positioned within said area on either side of said extension.

23. A construction in accordance with claim 22 including means for adjustably attaching said wedges comprising a plate positioned over said extension and said wedges, slots defined by said plate, and bolts extending through said slots and connected to said wedges.

* * * * *